Sept. 25, 1956 R. E. DIXON ET AL 2,764,624
ISOMERIZATION OF HYDROCARBONS
Filed April 6, 1953
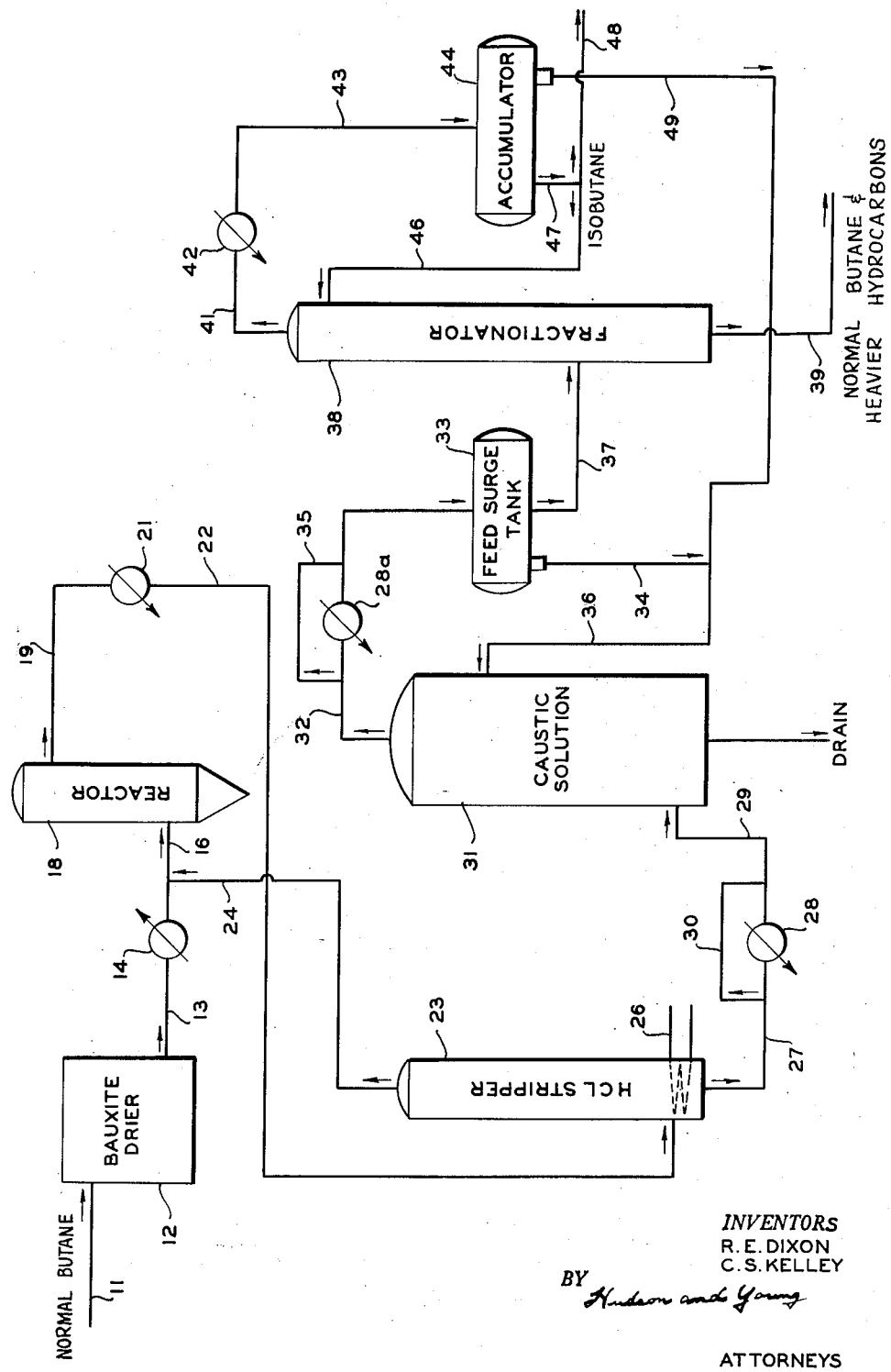
INVENTORS
R. E. DIXON
C. S. KELLEY
BY
Hudson and Young
ATTORNEYS United States Patent Office 2,764,624
Patented Sept. 25, 1956

2,764,624

ISOMERIZATION OF HYDROCARBONS

Rolland E. Dixon and Carl S. Kelley, Bartlesville, Okla., assignors to Phillips Petroleum Company, a corporation of Delaware Application April 6, 1953, Serial No. 347,063

10 Claims. (Cl. 260—683.5)

This invention relates to an improved process for the isomerization of hydrocarbons. In one of its more specific aspects, the invention relates to an improved process for the isomerization of light paraffinic hydrocarbons. In another of its more specific aspects, the invention relates to the treatment of the isomerization effluent. In still another of its more specific aspects, the invention relates to a method of maintaining the concentration of the caustic solution used in the treatment of the isomerization effluent.

The isomerization of paraffin hydrocarbons in the presence of aluminum halide catalysts such as aluminum chloride, aluminum bromide, etc. and their hydrocarbon complexes, either as such or supported on solid materials, is well known. It is also common practice to promote the reaction by the addition of a hydrogen halide such as hydrogen chloride or hydrogen bromide or a substance affording a hydrogen halide under reaction conditions. Commercial isomerization of normal butane to isobutane is effected in the vapor phase over solid aluminum chloride and in the presence of hydrogen chloride. One of the reasons for using vapor phase instead of liquid phase is that the carrying out of the reaction zone of aluminum chloride dissolved in the liquid effluent is avoided. The vaporous isomerization effluent will, however, contain some hydrogen chloride and aluminum chloride which must be removed. One method which has been used to effect removal of the hydrogen chloride and aluminum chloride is by passing the effluent through a simple stripping column so as to take substantially all of the hydrogen chloride overhead. The bottoms from the stripper are then cooled to about 100° F. and treated with a caustic solution to neutralize any remaining aluminum chloride or hydrogen chloride. The cooling of the effluent to about 100° F. is carried out in order to minimize the amount of water carried out of the caustic solution dissolved in the effluent, and as a result of such cooling it becomes necessary to heat the effluent to the required temperature before introduction into a fractionator for product separation. The water removed from the fractionated product and from the effluent after treatment with the caustic solution is thrown away with the result that the concentration of the caustic solution increases. The principal disadvantages of such a system is the necessity of cooling and then heating the isomerization effluent prior to introduction into a fractionator and the difficulty even after such cooling of maintaining the concentration of the caustic solution. These disadvantages are overcome by the process of the present invention.

The objects of this invention will be attained by the various aspects of the invention.

It is an object of the present invention to provide a process of isomerizing normal paraffins containing at least four carbon atoms per molecule in the presence of an aluminum halide catalyst and a hydrogen halide promoter.

Another object of the invention is to provide a method for maintaining the concentration of the caustic solution used to neutralize any aluminum halide or hydrogen halide in the isomerization effluent.

Still another object of the invention is to provide a process wherein it is unnecessary to heat the isomerization effluent after treatment with a caustic solution and before introduction into a fractionator.

A further object is to provide for more complete neutralization of the isomerization effluent by means of high temperature caustic treatment.

Numerous other objects will become apparent from the accompanying disclosure.

In accordance with the invention, using the isomerization of normal butane to isobutane with aluminum chloride as the catalyst in the presence of hydrogen chloride as an exemplary operation, the isomerization effluent on removal from the reactor is cooled and condensed and thereafter passed through a stripping column where hydrogen chloride is then removed as overhead. The effluent stripped of hydrogen chloride is cooled to approximately the temperature at which it is desired to subsequently introduce it into a fractionator. This temperature is usually in the range of about 140 to 180° F. The cooled effluent is next treated with a caustic solution to neutralize any aluminum chloride or hydrogen chloride after which it is sent to a surge tank wherein any entrained aqueous solution is separated and returned to the caustic treater. The hydrocarbon from the surge tank is charged to the fractionator, and the overhead product recovered therefrom has concentrated therein any water which was dissolved in the hydrocarbon. Most of this water is thereafter separated from the hydrocarbon and returned to the caustic treater. It has been found that by returning the water to the caustic treater as indicated, the concentration of the caustic solution is maintained substantially constant. Because it is thus possible to maintain the concentration of the caustic solution while still effecting removal of substantially all of the water from the hydrocarbon, it becomes unnecessary to cool the isomerization effluent to such a low temperature that subsequent heating is required before introduction into the fractionator.

A more comprehensive understanding of the invention will be had from a consideration of the accompanying drawing which forms a part of this specification and which is a diagrammatic flow sheet of my improved process.

Referring to the drawing, normal butane enters bauxite drier 12 through line 11 where moisture contained in the feed is removed. The gaseous feed is removed from drier 12 by line 13 and passes into heater 14 where it is heated to the conversion temperature maintained in reactor 18. The normal butane then passes into line 16 leading into the lower portion of reactor 18. During this flow through line 16, there is added to the normal butane by line 24 a desired amount of promoter, preferably hydrogen chloride. The normal butane containing the promoter passes through the catalyst bed within reactor 18, preferably aluminum chloride, where the isomerization reaction takes place at a temperature between about 210 and about 230° F. The vaporous isomerization effluent which will contain hydrogen chloride and aluminum chloride leaves the reactor through line 19 and passes into cooler 21 where it is condensed by reducing the temperature preferably to between about 50 and about 60° F. The resulting liquid is then passed through line 22 to stripper 23 which is operated so as to separate the hydrogen chloride which passes overhead through line 24 into line 16, as previously discussed. Heating means 26 is provided in the bottom of stripper 23 to maintain the desired temperature therein. Isomerization effluent free of hydrogen chloride at a temperature between about 200 to about 280° F. is removed from the bottom of stripper 23 and passed into cooler 28 where it is cooled to a temperature between about 140 to about 180° F., the approximate temperature at which it is desired to subsequently introduce the effluent into fractionator 38. The isomerization effluent is next introduced through line 29 into the bottom of a tower 31 containing a caustic solution which neutralizes any aluminum chloride or hydrogen chloride present in the effluent. The effluent leaves the top of tower 31 through line 32, after passing through packing which breaks away any entrained caustic from the hydrocarbon. The effluent then passes into surge tank 33 wherein any entrained aqueous solution is separated out and returned through lines 34 and 36 to the caustic solution in tower 31. The isomerization effluent, now free of aluminum chloride as well as hydrogen chloride, leaves surge tank 33 by line 37 and is introduced into fractionator 38. Within fractionator 38, the feed is separated into a fraction consisting largely of isobutane and a fraction comprising normal butane and heavier hydrocarbons. The normal butane and heavier hydrocarbons are withdrawn from fractionator 38 by line 39. Isobutane leaves fractionator 38 overhead through line 41 and passes into cooler 42 where it is condensed. In the overhead product, there is concentrated any water which was dissolved in the feed hydrocarbon. The liquid isobutane and water are passed from cooler 42 by line 43 into reflux accumulator 44. Most of the water separates out in accumulator 44 and, through line 49, is returned to tower 31 containing the caustic solution. The isobutane leaves accumulator 44 through line 47 substantially free of water, and is partly returned to fractionator 39 as reflux by line 46 and partly removed from the system as final product through line 48.

In a modification of this invention, the isomerization effluent on leaving stripper 23 is by-passed around cooler 28 by line 30 and introduced directly into tower 31. The effluent on leaving tower 31 is passed by line 35 into cooler 28a where it is cooled to a temperature between about 140 to 180° F., the temperature at which it is desired subsequently to introduce the effluent into fractionator 38. The effluent on leaving cooler 28a is next passed into surge tank 33, and the process thereafter is carried out as described above.

By thus carrying out the isomerization process, the caustic solution utilized in the treatment of the isomerization effluent is automatically maintained at a constant concentration. Because this is possible, it becomes unnecessary to cool the caustic solution to such a low temperature that substantially no water will be carried out of solution by dissolving in the hydrocarbon phase, and accordingly the heating step prior to fractionation can be eliminated. Furthermore, since in accordance with this process the treatment of effluent with caustic solution can be carried out at higher temperature, a much more efficient neutralization is thereby obtained.

While the foregoing relates specifically to the isomerization of normal butane to isobutane especially with aluminum chloride in the presence of hydrogen chloride, it is to be understood that the process may be applied to isomerization of higher paraffins, e. g., normal pentane and hexane. Various details such as valves, pumps, automatic control devices, etc., have been omitted for the sake of clarity and will be readily supplied by one wishing to practice the invention.

As will be evident to those skilled in the art various modifications of this invention can be made, or followed, in the light of the foregoing disclosure and discussion, without departing from the spirit or scope of the disclosure.

We claim:

1. In a process for the isomerization of normal paraffins containing at least 4 carbon atoms per molecule in the presence of an aluminum halide catalyst, the combination of steps which comprises treating the isomerization effluent with a caustic solution; removing the water from the treated effluent; and returning the water to said caustic solution.

2. In a process for the isomerization of normal paraffins containing at least 4 carbon atoms per molecule in the presence of an aluminum halide catalyst, the combination of steps which comprises treating the isomerization effluent with a caustic solution; removing entrained aqueous caustic solution from the treated effluent, returning said removed aqueous caustic solution to said caustic solution; introducing said treated effluent without prior heating into a fractionation zone; separating water from the product removed as overhead from said fractionation zone; and returning said water to said caustic solution.

3. In a process for the isomerization of normal paraffins containing at least 4 carbon atoms per molecule in the presence of an aluminum halide catalyst, the combination of steps which comprises cooling the isomerization effluent to the approximate temperature at which said effluent is to be subsequently introduced into a fractionation zone; treating said effluent with a caustic solution; removing entrained aqueous caustic solution from the treated effluent; returning said removed aqueous caustic solution to said caustic solution; introducing said treated effluent without prior heating into said fractionation zone; separating water from the product removed as overhead from said fractionation zone; and returning said water to said caustic solution.

4. In a process for the isomerization of normal paraffins containing at least 4 carbon atoms per molecule in the presence of an aluminum halide catalyst, the combination of steps which comprises treating the isomerization effluent with a caustic solution; removing entrained aqueous caustic solution from the treated effluent; returning said removed aqueous caustic solution to said caustic solution; introducing said treated effluent without prior heating into a fractionation zone; separating in said fractionation zone a vaporous fraction comprising the product isoparaffin and water; cooling and condensing said vaporous fraction; and separating the water out of the resulting liquid, said water then being returned to said caustic solution.

5. In a process for the isomerization of normal paraffins containing at least 4 carbon atoms per molecule in the presence of an aluminum halide catalyst, the combination of steps which comprises cooling the isomerization effluent to the approximate temperature at which said effluent is to be subsequently introduced into a fractionation zone; treating said effluent with a caustic solution; removing entrained aqueous caustic solution from the treated effluent; returning said removed aqueous caustic solution to said caustic solution; introducing said treated effluent without prior heating into said fractionation zone; separating in said fractionation zone a vaporous fraction comprising the product isoparaffin and water; cooling and condensing said vaporous fraction; and separating the water out of the resulting liquid, said water then being returned to said caustic solution.

6. The process of claim 5 wherein the isomerization effluent is cooled to a temperature between about 140 and about 180° F.

7. In a process wherein normal paraffins containing at least 4 carbon atoms per molecule are isomerized by passage in admixture with hydrogen chloride under isomerization conditions through a reaction zone containing an aluminum chloride catalyst, the combination of steps which comprises stripping hydrogen chloride gas contaminated with other gases from the reaction products; cooling said reaction products to the approximate temperature at which said reaction products are to be subsequently introduced into a fractionating zone; treating said reaction products with a caustic solution to remove any traces of aluminum chloride contained therein; passing the aluminum chloride-free reaction products to said fractionating zone; removing as overhead from said fractionating zone hydrocarbon vapors comprising essentially the product isoparaffin and water; condensing said overhead to form a liquid; removing the water from said liquid and feeding at least a portion of the water-free liquid into the top of said fractionating zone as reflux therefor; and returning the water to said caustic solution in order to maintain a solution of substantially constant concentration.

8. The process of claim 7 wherein the reaction products are cooled to a temperature between about 140 to about 180° F.

9. In a process wherein normal paraffins containing at least four carbon atoms per molecule are isomerized by passage in admixture with a hydrogen halide under isomerization conditions through a reaction zone containing an aluminum halide catalyst to form reaction products which are stripped of hydrogen halide gas, the combination of steps which comprises cooling said reaction products to a temperature between about 140 and 180° F.; treating said cooled reaction products with a caustic solution; removing entrained aqueous caustic solution from the treated reaction products; returning said removed entrained caustic solution to said caustic solution; introducing said treated reaction products into a fractionation zone; separating water from the product removed as overhead from said fractionation zone; and returning said water to said caustic solution.

10. In a process wherein normal paraffins containing at least four carbon atoms per molecule are isomerized by passage in admixture with a hydrogen halide under isomerization conditions through a reaction zone containing an aluminum halide catalyst to form reaction products which are stripped of hydrogen halide gas in a stripping zone, the combination of steps which comprises treating said reaction products recovered from said stripping zone with a caustic solution; cooling said treated reaction products to a temperature between about 140 and 180° F.; removing entrained aqueous caustic solution from said treated reaction products; returning said removed aqueous caustic solution to said caustic solution; introducing said treated reaction products into a fractionation zone; separating water from the product removed as overhead from said fractionation zone; and returning said water to said caustic solution.

References Cited in the file of this patent

UNITED STATES PATENTS

| | | |
|---|---|---|
| 2,260,990 | Goldsby et al. | Oct. 28, 1941 |
| 2,320,293 | Ostergaard | May 25, 1943 |
| 2,399,765 | Shoemaker et al. | May 7, 1946 |
| 2,410,886 | Lien et al. | Nov. 12, 1946 |
| 2,425,074 | Waugh | Aug. 5, 1947 |
| 2,433,482 | Robert | Dec. 30, 1947 |
| 2,556,438 | Parker et al. | June 12, 1951 |
| 2,693,442 | Tom et al. | Nov. 2, 1954 |